United States Patent
Wang

(10) Patent No.: US 9,138,713 B2
(45) Date of Patent: Sep. 22, 2015

(54) PLANTS AND PROCESSES FOR FORMING POLYMERS

(71) Applicant: ExxonMobil Chemical Patents Inc., Baytown, TX (US)

(72) Inventor: Yu Feng Wang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 14/310,546

(22) Filed: Jun. 20, 2014

(65) Prior Publication Data

US 2014/0301903 A1   Oct. 9, 2014

Related U.S. Application Data

(62) Division of application No. 13/600,600, filed on Aug. 31, 2012, now Pat. No. 8,796,408.

(51) Int. Cl.
| | | |
|---|---|---|
| *B01J 19/18* | (2006.01) | |
| *C08F 210/00* | (2006.01) | |
| *B01J 19/00* | (2006.01) | |
| *C08F 210/06* | (2006.01) | |

(52) U.S. Cl.
CPC ........... *B01J 19/0053* (2013.01); *C08F 210/06* (2013.01)

(58) Field of Classification Search
CPC ........ C08F 210/06; C08F 10/10; C08F 2/001; C08F 2/06; C08F 210/16; C08F 201/14; C08F 210/08; C08F 210/20; C08F 236/20; C08F 2500/17; C08F 2500/25; B01J 19/0053
USPC ........................................................ 422/135
See application file for complete search history.

(56) References Cited

U.S. PATENT DOCUMENTS

| | | | |
|---|---|---|---|
| 3,912,698 | A | 10/1975 | Shurts |
| 5,599,885 | A | 2/1997 | Kawasaki et al. |
| 6,881,800 | B2 | 4/2005 | Friedersdorf |
| 7,163,989 | B2 | 1/2007 | Friedersdorf |
| 2011/0172383 | A1* | 7/2011 | Yeh et al. ................ 526/348 |
| 2012/0149856 | A1 | 6/2012 | Wang et al. |

FOREIGN PATENT DOCUMENTS

| | | |
|---|---|---|
| WO | WO 92/14766 | 9/1992 |
| WO | WO 94/00500 | 1/1994 |

(Continued)

OTHER PUBLICATIONS

Gutowski et al., "*A Low-Energy Solvent Separation Method*", Polymer Engineering and Science, Mar. 1983, vol. 23, No. 4, pp. 230-237.
Han et al., "*Short Chain Branching Effect on the Cloud-Point Pressures of Ethylene Copolymers in Subcritical and Supercritical Propane*," Macromolecules 1998, vol. 31, pp. 2533-2538.

(Continued)

*Primary Examiner* — William Cheung

(57) ABSTRACT

The present invention relates to a process of forming a polymer, the process comprising polymerizing olefin monomers to form a reaction mixture, treating the reaction mixture to form a first polymer-rich phase, treating the first polymer-rich phase to form a second polymer-rich phase, and devolatilizing the second polymer-rich phase, the process further comprising at least one step of adjusting the temperature of a first and/or the second polymer-rich phase before the devolatilization. The present invention also relates to a plant that is useful for the process provided above.

8 Claims, 3 Drawing Sheets

(56) References Cited

FOREIGN PATENT DOCUMENTS

| WO | WO 98/02471 | 1/1998 |
|----|----|----|
| WO | WO 00/11048 | 3/2000 |
| WO | WO 00/17244 | 3/2000 |
| WO | WO 2011/008955 | 1/2011 |
| WO | WO 2011/087728 | 7/2011 |
| WO | WO 2011/087729 | 7/2011 |
| WO | WO 2011/087730 | 7/2011 |
| WO | WO 2011/087731 | 7/2011 |

OTHER PUBLICATIONS

Irani et al., "*Lower Critical Solution Temperature Behavior of Ethylene Propylene Copolymers in Multicomponent Solvents*," Journal of Applied Polymer Science (1986), vol. 31, pp. 1879-1899.

McHugh et al., "*Separating Polymer Solutions with Supercritical Fluids*," Macromolecules 1985, vol. 18, pp. 674-680.

Tanaka, H., "*Critical dynamics and phase separation kinetics in dynamically asymmetric binary fluids: New dynamic universality class for polymer mixtures of dynamic crossover?*," Journal of Chemical Physics 01, Apr. 1994, 100 (7), pp. 5323-5337.

* cited by examiner

PLANTS AND PROCESSES FOR FORMING POLYMERS

CROSS REFERENCE TO RELATED APPLICATIONS

This application is a divisional of and claims priority to U.S. patent application Ser. No. 13/600,600, filed Aug. 31, 2012, now issued as U.S. Pat. No. 8,796,408, the disclosure of which is incorporated herein by reference in its entirety.

FIELD OF THE INVENTION

The disclosure relates to plants and processes for polymerization to form polymers, in particular to plants and processes for continuous solution polymerization.

BACKGROUND OF THE INVENTION

Continuous solution polymerization processes generally involve the addition of catalyst to a monomer and solvent mixture. The mixture may be back-mixed giving a uniform polymer in an environment with substantially no concentration gradients. WO 94/00500 (Pannell et al.) describes a solution polymerization using metallocene in a continuous stirred tank reactor, which may be in a series reactor arrangement to make a variety of products.

The heat of the polymerization reaction, called an exotherm, can be absorbed by the reaction mixture. Alternatively, or in addition, the heat of reaction can be removed by a cooling system, such as by external cooling of the walls of the reactor vessel, or by internally arranged heat exchange surfaces cooled by a heat exchange fluid.

In the course of the polymerization, typically a predominant amount of the monomers is consumed and the polymers formed are dissolved in the solvent. Usually, the higher the concentration of the polymer, the higher the viscosity of the polymerization reaction mixture containing the polymer, solvent, and unreacted components. The mixture passes from the polymerization reactor to a finishing section in which polymer, solvent and unreacted monomer are separated. In the finishing step, solvent and unreacted monomers are progressively removed from the reaction mixture until the polymer can be formed into a solid pellet or bale. The separated solvent and monomer can be recycled to the polymerization reactor.

Polymer solutions are known to undergo phase separation at the lower critical solution temperature, with phase separation being encouraged by higher temperatures and/or by lower pressures. Solvent selection also influences the conditions where phase separation occurs.

The phenomenon of phase separation is a consideration in the selection of the polymerization solvent. Appropriate polymerization monomer conversions (especially for volatile monomers), temperatures and pressures should be selected for given polymer/solvent combination conditions to avoid unwanted phase separation inside the reactor. For example, solvents such as hexane may require an elevated pressure in excess of 5 MPa to avoid two-phase conditions for olefin polymerization; solvents such as octane can maintain homogeneous one-phase conditions at lower pressures.

The phenomenon of phase separation can be arranged after the reaction step to separate volatile solvent and unreacted monomers on one hand, and polymers on the other hand. In that case, separation at a temperature well above the lower critical solution temperature is encouraged to allow the polymer to form a concentrated phase. Some earlier articles which explain the general principles include: "A Low-Energy Solvent Separation Method," by T. G. Gutowski et al., Polymer Engineering and Science, March 1983, Vol. 23, No. 4, pp. 230-237; "Lower Critical Solution Temperature Behavior of Ethylene Propylene Copolymers in Multicomponent Solvents" by C. A. Irani et al., in Journal of Applied Polymer Science (1986), Vol. 31, pp. 1879-1899; "Separating Polymer Solutions with Supercritical Fluids," by Mark A. McHugh et al., in Macromolecules 1985, Vol. 18, pp. 674-680; "Critical dynamics and phase separation kinetics in dynamically asymmetric binary fluids: New dynamic universality class for polymer mixtures or dynamic crossover?" by Hajime Tanaka in Journal of Chemical Physics 1 Apr. 1994, 100 (7), pp. 5323-5337; "Short Chain Branching Effect on the Cloud Point Pressures of Ethylene Copolymers in Subcritical and Supercritical Propane" by S. J. Han et al., in Macromolecules 1998, Vol. 31, pp. 2533-2538.

The finishing section may also comprise a devolatilizer, in particular a vacuum devolatilizer in which the molten polymer is exposed to a vacuum while being intensively agitated to draw off volatiles such as solvent and residual monomer in order to reduce the level of volatile component(s) in the final polymer to a desired level.

U.S. Pat. Nos. 6,881,800 and 7,163,989 relate to processes and plants for continuous solution polymerization. Such plants and processes include a pressure source, a polymerization reactor downstream of said pressure source, a pressure let-down device downstream of said polymerization reactor, and a separator downstream of said pressure let-down device, wherein said pressure source is sufficient to provide pressure to said reaction mixture during operation of said process plant to produce a single-phase liquid reaction mixture in said reactor and a two-phase liquid-liquid reaction mixture in said separator in the absence of an additional pressure source between said reactor and said separator.

Many types of catalysts are known for olefin polymerization, including Ziegler-Natta, chromium catalysts and single site catalysts (SSC) or metallocene catalysts. The use of single site catalysts is associated with poor solubility in nonpolar, saturated aliphatic hydrocarbons, which are typically used for homogeneous solution polymerization. As a result, an aromatic catalyst solvent, such as toluene may be used. However, this in turn can complicate solvent separation to prevent toluene build up in the reactor and lead to environmental pollution and added maintenance expenditure.

WO 98/02471 discloses a process for polymerizing ethylene, alpha-olefin and optionally diene monomers. The process comprises the steps of contacting: (1) ethylene; (2) at least one $C_3$-$C_{20}$ aliphatic alpha-olefin; (3) optionally at least one $C_4$-$C_{20}$ diene; (4) a catalyst, the catalyst comprising (a) a metallocene complex and (b) an activator; and (5) a solvent. The process can be conducted in single or multiple reactors, and if in multiple reactors, the reactors can be configured in series or parallel. Solvent is removed from the polymer stream in an anhydrous first stage solvent recovery operation such that the solids concentration of the product stream is increased by at least 100 percent. Additional solvent is removed in an anhydrous second stage solvent recovery operation from the product of the first stage solvent recovery operation such that the solids concentration of the product stream is in excess of 65 weight percent.

Polymers prepared by ordinary continuous solution polymerizations are known to contain a relatively high amount of volatile component(s), which often makes further treatment such as back venting in subsequent extrusion necessary. In case the desired polymers have a relatively low viscosity, the pelletization rate of polymers prepared thereby in the finishing section is still not ideal.

Therefore, there remains a need for improved continuous solution processes and plants which provide one or more of the following advantages: producing polymers containing a trace amount of volatile component(s) with minimal requirement for additional equipment and minimal operating costs across a broad range of operating windows including varying polymerization temperatures; producing a broad spectrum of polymers, particularly polymers of widely varying average molecular weights, molecular weight distributions, and/or comonomer contents; enabling production of polymers having useful molecular weights at high temperatures (for example, above 150° C.); and increasing pelletization rate of polymers in the finishing section.

Additional background information may be found in U.S. Pat. Nos. 3,912,698, 5,599,885, WO 94/00500, WO 92/14766, WO2011/087728, WO2011/087729, WO2011/087730, and WO2011/087731.

SUMMARY OF THE INVENTION

The present invention in one aspect provides a process for forming a polymer comprising the steps of: (a) supplying a feed having one or more olefin monomer(s) and a solvent; (b) contacting the feed with a catalyst to form a reaction mixture; (c) treating the reaction mixture to form a first polymer-rich phase; (d) treating the first polymer-rich phase to form a second polymer-rich phase; (e) devolatilizing the second polymer-rich phase to obtain the polymer; and (x) adjusting between step (c) and step (e) the temperature of the first and/or the second polymer-rich phases.

The present invention in another aspect provides a plant for forming a polymer, the plant comprising: a reactor for polymerizing monomers to form a reaction mixture; a first separator downstream of the reactor for treating the reaction mixture to form a first polymer-rich phase; a second separator downstream of the first separator for treating the first polymer-rich phase to form a second polymer-rich phase; a devolatilizer downstream of the second separator for removing volatile component(s) from the second polymer-rich phase to obtain the polymer; and one or more temperature adjustment units for adjusting the temperature of the first and/or the second polymer-rich phases at one or more locations downstream of the first separator and upstream of the devolatilizer.

DETAILED DESCRIPTION OF THE INVENTION

Figure 1:
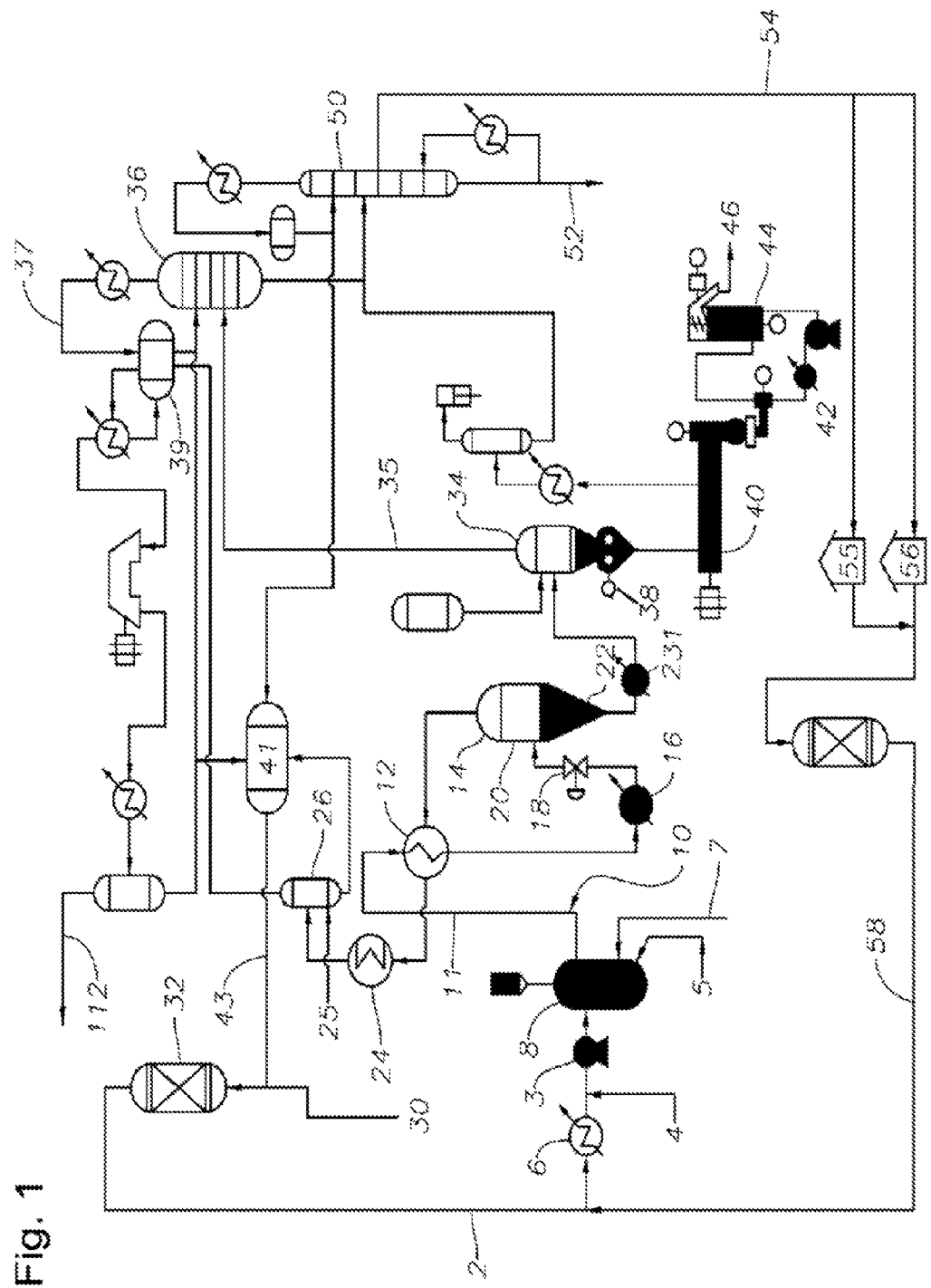
FIG. 1 shows a schematic layout of plant and process flow in one embodiment of the invention in which a temperature adjustment unit is arranged downstream of the first separator and upstream of the second separator.

Not intended to be bounded by any theories, it has been found that the temperature of the polymer-rich phase has significant effects on the efficiency of solvent removal downstream in the devolatilizer and pelletization rate during pelletization stage. If the desired polymer has a relatively high viscosity, it has been found that the volatile components contained in the polymer-rich phase reduce by 100 ppm by weight for one Fahrenheit degree (° F.) increase of the temperature of the polymer-rich phase fed to devolatilizer. In addition, if the desired polymer has a relatively low viscosity, it has been found that, during pelletization stage of the devolatilized polymer, the lower the temperature of the devolatilized polymer, the higher the pelletization rate of the polymer due to the increased melt strength through crystallization. Thus, one can debottleneck the production process by heating and/or cooling of the polymer-rich phase depending on the stage of the production.

In one embodiment, provided is a process of forming a polymer comprising the steps of: (a) supplying a feed having one or more olefin monomer(s) and a solvent; (b) contacting the feed with a catalyst to form a reaction mixture; (c) treating the reaction mixture to form a first polymer-rich phase; (x) increasing or decreasing the temperature of the first polymer-rich phase; (d) treating the first polymer-rich phase to form a second polymer-rich phase; and (e) devolatilizing the second polymer-rich phase to obtain the polymer.

In another embodiment, provided is a process of forming a polymer comprising the steps of: (a) supplying a feed having one or more olefin monomer(s) and a solvent; (b) contacting the feed with a catalyst to form a reaction mixture; (c) treating the reaction mixture to form a first polymer-rich phase; (d) treating the first polymer-rich phase to form a second polymer-rich phase; (x) increasing or decreasing the temperature of the second polymer-rich phase; and (e) devolatilizing the second polymer-rich phase to obtain the polymer.

In still another embodiment, provided is a process of forming a polymer comprising the steps of: (a) supplying a feed having one or more olefin monomer(s) and a solvent; (b) contacting the feed with a catalyst to form a reaction mixture; (c) treating the reaction mixture to form a first polymer-rich phase; (x) increasing or decreasing the temperature of the first polymer-rich phase; (d) treating the first polymer-rich phase to form a second polymer-rich phase; (y) increasing or decreasing the temperature of the second polymer-rich phase; and (e) devolatilizing the second polymer-rich phase to obtain the polymer.

In one embodiment, provided is a plant for forming a polymer, the plant comprising a reactor for polymerizing monomers to form a reaction mixture; a first separator downstream of the reactor suitable for treating the reaction mixture to form a first polymer-rich phase; a temperature adjustment unit downstream of the first separator for increasing or decreasing the temperature of the first polymer-rich phase; a second separator downstream of the temperature adjustment unit suitable for treating the first polymer-rich phase to form a second polymer-rich phase wherein the polymer is more concentrated than the first polymer-rich phase; and a devolatilizer downstream of the second separator suitable for removing volatile component(s) from the second polymer-rich phase to obtain the polymer.

In another embodiment, provided is a plant for forming a polymer, the plant comprising a reactor for polymerizing monomers to form a reaction mixture; a first separator downstream of the reactor suitable for treating the reaction mixture to form a first polymer-rich phase; a second separator downstream of the first separator suitable for treating the first polymer-rich phase to form second polymer-rich phase wherein the polymer is more concentrated than in the first polymer-rich phase; a temperature adjustment unit downstream of the second separator suitable for increasing in one embodiment or decreasing in another embodiment, the temperature of the second polymer-rich phase; and a devolatilizer downstream of the temperature adjustment unit suitable for removing volatile component(s) from the second polymer-rich phase to obtain the polymer.

In a further embodiment, provided is a plant for forming a polymer, the plant comprising a reactor for polymerizing monomers to form a reaction mixture; a first separator downstream of the reactor suitable for treating the reaction mixture to form a first polymer-rich phase; a temperature adjustment unit downstream of the first separator for increasing or decreasing the temperature of the first polymer-rich phase; a second separator downstream of the temperature adjustment unit suitable for treating the first polymer-rich phase to form a second polymer-rich phase wherein the polymer is more concentrated than in the first polymer-rich phase; an additional temperature adjustment unit downstream of the second separator suitable for increasing or decreasing the temperature of the second polymer-rich phase; and downstream of the additional temperature adjustment unit, a devolatilizer suitable for removing volatile component(s) from the second polymer-rich phase to obtain the polymer.

In one or more preferred embodiments, the reactor may be a single reactor or multiple reactors, for example two reactors arranged in parallel or in series. Each reactor may be a continuous stirred tank reactor. In one or more preferred embodiments, two reactors are arranged in parallel or in series, and the internal volume of the first reactor to the internal volume of the second reactor may have a minimum ratio value of 50:50, 55:45, 60:40, 65:35, 70:30, 80:10, 85:15, or 90:10, and a maximum ratio value of 55:45, 60:40, 65:35, 70:30, 80:20, 85:15, 90:10, or 95:5, so long as the maximum ratio value is greater than the minimum ratio value. The reaction mixtures from the two reactors are combined and then passed to the first separator. In one or more embodiments, the reactor(s) may be a reactor suitable for continuous solution polymerization, for example, a continuously stirred flow tank.

Now the present invention will be described by illustration of a continuous solution polymerization, but the present invention is not limited to continuous solution polymerizations, and persons of ordinary skills in the art would understand that within the merit and spirit of the present invention, the plants and processes would be suitable for various types of polymerizations.

Monomers and catalysts may be supplied into the reactor(s) by any suitable units or apparatus. The plant may comprise a feed supplying unit for supplying a feed having one or more olefin monomers in a solvent, for example, a hydrocarbon solvent. The plant of the present invention may also comprise a catalyst supply unit suitable for supplying a catalyst to the reactor. The feed supply units suitable for supplying a feed of one or more olefin monomers in a solvent to the reactor may be any suitable apparatus, but will typically include a conduit for the supply of each of the monomers, a conduit for the supply of recycled solvent, and a conduit for the supply of fresh solvent. Each of these conduits may be fed to a common feed conduit prior to entry into the reactor. A pump or pumps may be used to pump the feed to the reactor or reactors and to pressurize the feed to the desired pressure. The catalyst supply units suitable for supplying a catalyst to the reactor may be any suitable apparatus, but will typically include a conduit for the supply of the catalyst, and optionally a pump or pumps to pump the catalyst to the reactor or reactors.

The first separator (e.g., "liquid phase separator" herein) may be an apparatus in which a liquid reaction mixture can be exposed to conditions under which it can separate into two liquid phases—a first polymer-rich phase and a lean phase.

The second separator (e.g., "flash tank" herein) may be an apparatus in which the liquid first polymer-rich phase can be exposed to conditions under which it can be separated into a vapor phase and a second polymer-rich phase in which the polymer is more concentrated than in the first polymer-rich phase.

The temperature adjustment unit may be any device through which the first and/or the second polymer-rich phase can be heated or cooled before being passed into the device downstream of the temperature adjustment unit. Preferably, the temperature adjustment unit is a heat exchanger. The heat exchanger preferably comprises tubes with or without internal mixing element or parallel tubes with distributors, to avoid mal-distribution of the polymer-rich phase. Heat exchange medium can be oil, steam, water, etc.

The devolatilizer may be any device in which the second polymer-rich phase can be exposed to a lower pressure, preferably a vacuum, whilst being agitated, kneaded, extruded, or sprayed to expose new surface area, thereby causing further residual solvent and monomer to evaporate and be drawn off. Exemplary devolatilizers include, but are not limited to, a vacuum devolatilizer, a vented extruder, a flash pot, a falling strand evaporator, or a thin film evaporator. Useful devolatilizers also include those described in U.S. Pat. Nos. 5,453,158, 4,940,472, 3,917,507, 3,799,234, 3,797,550, and 2,804,920; U.S. Patent Publication No. 2011/172383, and WO 2011/087730, the contents of which are incorporated herein by reference.

In one or more embodiments, the plants further include stabilizer addition units for adding stabilizer to the second polymer-rich phase at a location downstream of the second separator and upstream of the vacuum devolatilizer. Further details relating to the addition of stabilizer are described in WO 2011/087731.

By raising the pressure by, for example, a pump to above 2 MPa, above 5 MPa, above 7.5 MPa, above 12 MPa, or above 15 MPa, the formation of two-phase conditions can be avoided in the reactor arrangement and heating arrangement under a wide range of temperature and polymerization conditions. Hence, a wide variety of catalysts can be used in the process. Such a wide range of catalysts can be used to make high and/or low average molecular weight materials under optimized production conditions. Use of a separate pump to boost the pressure of the viscous reaction mixture between the reactor and the first separator can be optional (such pumps are more costly than the low viscosity feed pumps). The pressure of the pump also cascades through the process and combines with the absence of vaporization for the initial solvent separating stage to reduce overall pumping needs during finishing. The pressure of the pump advances the viscous reaction mixture to pressure reducing means upstream of the first separator without allowing phase separation prior to the pressure reducing means. In a preferred embodiment, the pressure of the pump additionally advances one or both separated phases to further downstream fractionating systems or purification devices.

Preferably, a catalyst killer is added downstream of the reactor or reactors and upstream of the first separator to suppress further polymerization of the heated reaction mixture during separation. The lean phase is passed through a cooling apparatus, which may comprise a heat integrating exchanger and a final cooler, and optionally a drier back to the inlet side of the pump. The first polymer-rich phase is subjected to additional solvent removal downstream to obtain a solid polymer.

The addition of the catalyst killer permits the temperature to be increased without risking further polymerization so as to facilitate direct recycle, after removal of any surplus killer, of separated solvent and monomer to the feed supply units on the inlet side of the pump. The term "direct" means that the lean phase generally does not need to be fractionated.

Preferably, energy consumption per unit polymer produced is low, with simple solvent recovery and energy integration systems. This helps minimize discharges to atmosphere and recover heat from the effluent on the liquid phase separator.

Figure 3:
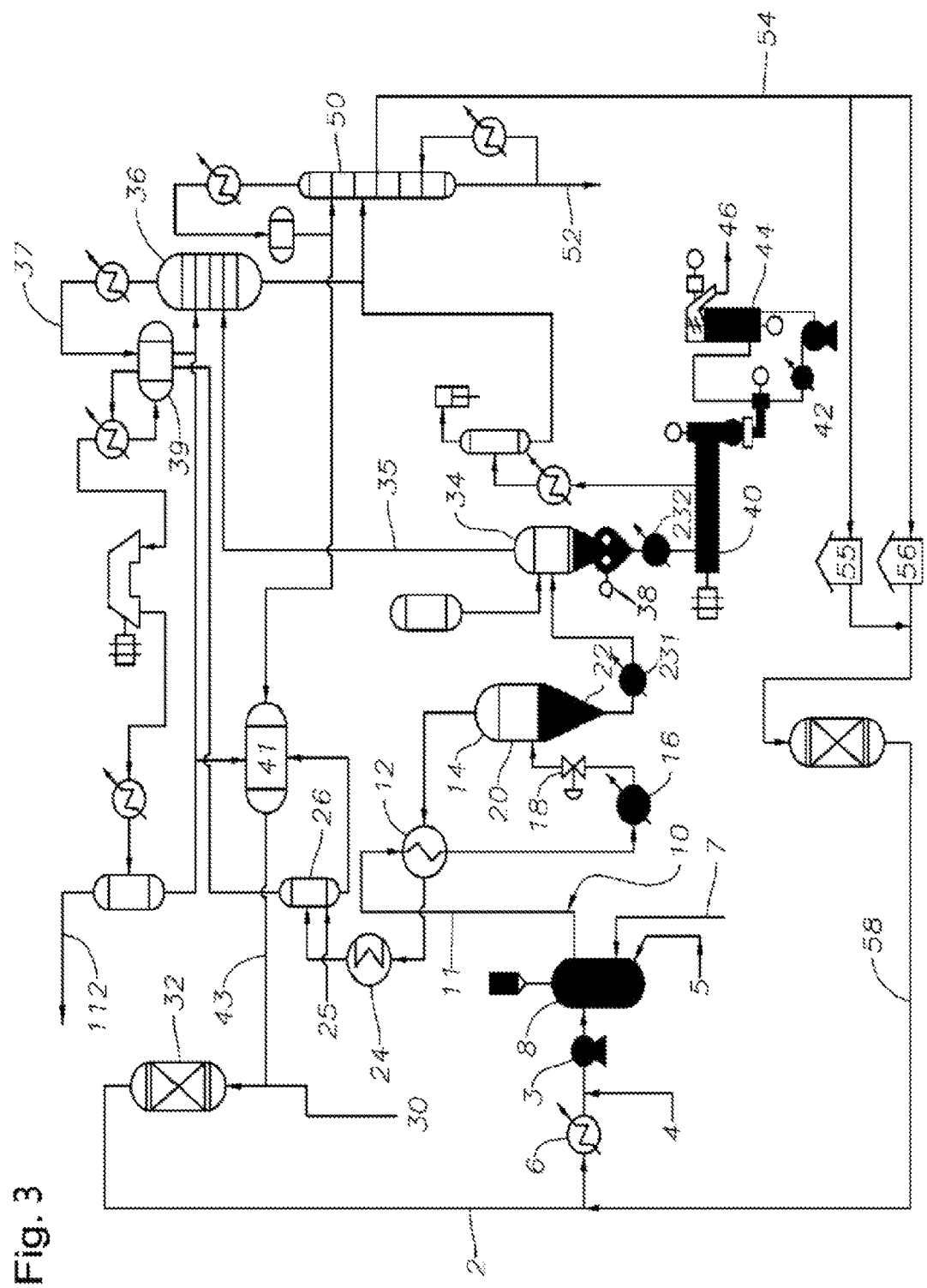
FIG. 3 shows a schematic layout of plant and process flow in still another embodiment of the invention in which a temperature adjustment unit is arranged downstream of the first separator and upstream of the second separator and an additional temperature adjustment unit is arranged downstream of the second separator and upstream of the devolatilizer.

Preferably, the first separator is connected to a heat exchanger arranged downstream of the first separator, before being connected to the second separator, as shown in FIGS. 1 and 3. The heat exchanger can be used for increasing or decreasing the temperature of the first polymer-rich phase so as to adjust the temperature of it.

The first separator operates at a pressure lower than the pressure of the reaction mixture so as to allow the liquid reaction mixture to be separated into the first polymer-rich phase and the lean phase. Preferably, the pressure of the first separator is from 2 MPa, 2.5 MPa, 3 MPa, or 4 MPa, to 15 MPa, 12 MPa, 10 MPa, 8 MPa, or 6 MPa. The first polymer-rich phase from the first separator can be passed through the heat exchanger to increase or decrease the temperature of the first polymer-rich phase. Preferably, the lean phase from the first separator is passed in liquid form to a hydrogen removal apparatus for removing hydrogen added to or generated during polymerization. The hydrogen removal apparatus may comprise a unit for contacting a stripping vapor with the lean phase in a countercurrent flow arrangement to concentrate the hydrogen in the vapor phase for removal from the lean phase recycle.

Downstream of the temperature adjustment unit, the first polymer-rich phase enters a second separator operating at a pressure such that solvent and residual monomers can be vaporized to form a vapor phase and a second polymer-rich phase in which the polymer is more concentrated than in the first polymer-rich phase. Preferably, the second separator operates at a pressure sufficient to allow feeding of the vapor phase to the fractionating and purification system without requiring a separate compressor. Preferably, said pressure is generally greater than 0.05 MPa, 0.1 MPa, or 0.2 MPa. The pressure in the second separator can be raised to a high level between 0.5 MPa and 2 MPa to adjust the solution viscosity and to facilitate feeding of the second polymer-rich phase for devolatilization downstream of the second separator. The vapor phase separated from the first polymer-rich phase can be optionally conveyed to a fractionating tower as a vapor arranged downstream of the flash tank for purification.

Figure 2:
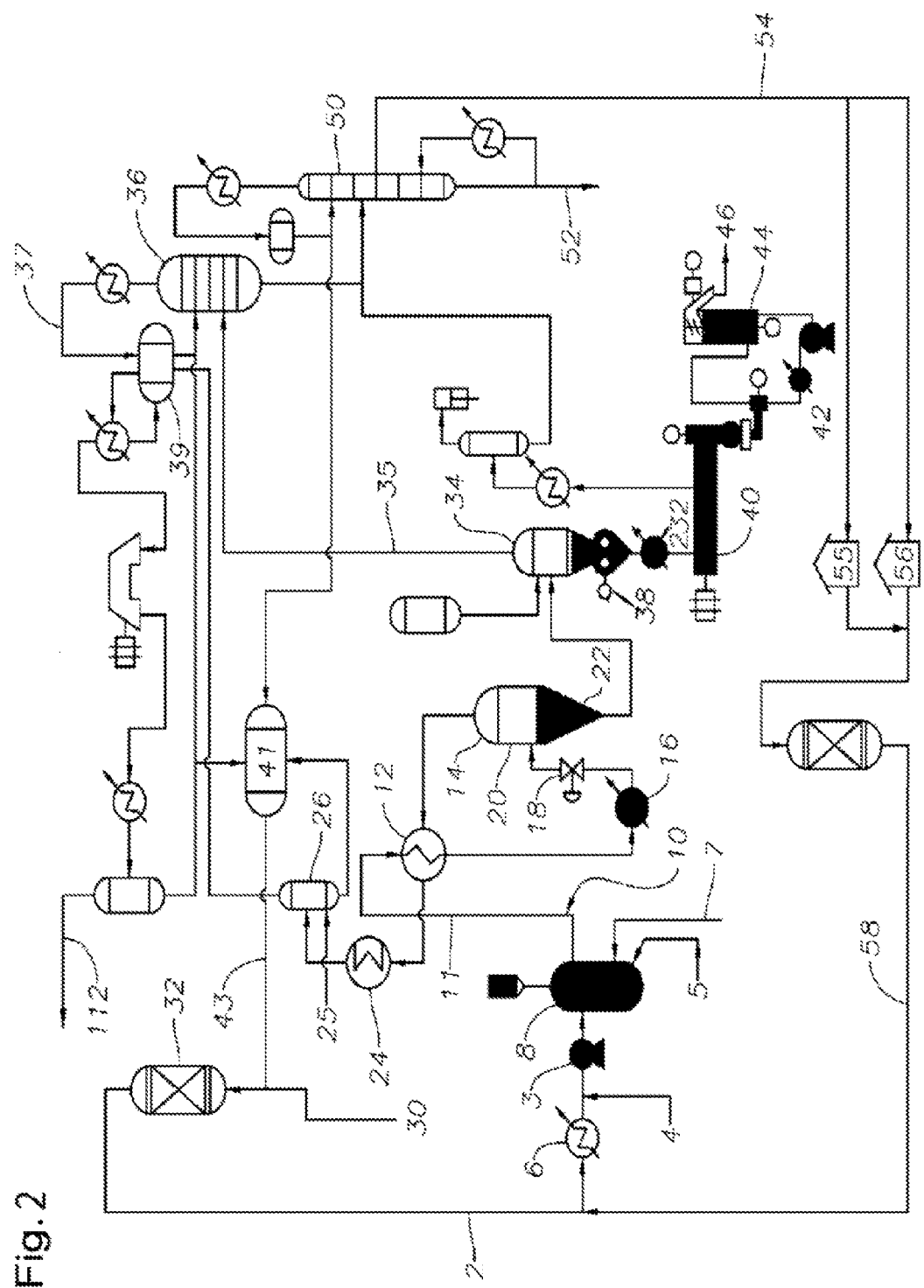
FIG. 2 shows a schematic layout of plant and process flow in another embodiment of the invention in which a temperature adjustment unit is arranged downstream of the second separator and upstream of the devolatilizer.

Preferably, before the second polymer-rich phase is passed into the devolatilizer, it can be passed through an additional temperature adjustment unit, for example, a heat exchanger as shown in FIGS. 2 and 3. The second polymer-rich phase can be heated or cooled through the heat exchanger upon desired effects on the polymer production.

The second polymer-rich phase may comprise at least 50 wt %, at least 60 wt %, or at least 70 wt % of polymer, based on the weight of the second polymer-rich phase. The vapor phase can be separated as an overhead stream from the second separator and the second polymer-rich phase typically can be collected in the bottom of the second separator from where it passes through an outlet into a conduit and eventually flows to the devolatilizer.

The plant preferably comprises a pump, for example a gear pump arranged upstream or downstream of the heat exchanger for withdrawing the heated or cooled second polymer-rich phase from the second separator and pumping it to the inlet of the devolatilizer.

Preferably, the level of volatiles (typically residual solvent and monomer) present in the second polymer-rich phase can be less than 30 wt %, or less than 20 wt %, or less than 10 wt %. The level of volatiles in the polymer product downstream of the devolatilizer is preferably not more than 0.5 wt %, or not more than 0.1 wt %, or not more than 0.08 wt %, or not more than 0.06 wt %, or not more than 0.05 wt %, or not more than 0.03 wt %.

Preferably, the pressure in the devolatilizer is not more than 55 mmHg, or not more than 30 mmHg, or not more than 20 mmHg, or not more than 15 mmHg. The temperature preferably is from 150° C. to 270° C.

Preferably, the solvent is a non-polar solvent which does not coordinate or interfere with the catalyst in a meaningful way so as to inhibit the catalytic action of the catalyst system. Preferably, the process uses a low boiling alkane based solvent, or mixtures thereof, which may be linear or branched, such as those having from 4 to 10 carbon atoms, preferably from 5 to 7 carbon atoms, optionally in admixture with other alkanes of a higher or lower molecular weight. The solvent is preferably a hexane and/or isohexane.

The polymer may be derived of monomers comprising mono-olefins such as ethylene or propylene or other higher alpha-olefins having from 4 to 10 carbon atoms. This combination provides a mixture which can be easily separated inside the liquid phase separator.

Working pressures in the reactor(s) described herein can be 8 MPa or more, 9 MPa or more; 10 MPa or more and especially 12 MPa or more, or even 14 MPa or more. The upper pressure limit may not be critically constrained, but typically can be 20 MPa or less, preferably 18 MPa or less, or 15 MPa or less, or 14 MPa or less, or 12 MPa or less. Preferably, the pressure is sufficient to keep the reaction mixture in a single phase up to the point of the pressure reducing means and to provide the necessary working pressure to convey the fluids through the plant.

The feed temperature may vary depending on the available exotherm and extent of monomer conversion desired to reach the polymerization temperature. Preferably, the temperature is not higher than 40° C., or not higher than 20° C., or not higher than 0° C., or not higher than −20° C., and is preferably less than −20° C., for example, in the range of from −20° C. to −40° C. The polymerization temperature may vary from the desired molecular weight of the polymers allowing for the influence of any chain transfer agent, for example hydrogen added. In a series reactor process, the temperature in the successive reactors can be raised progressively in increments depending on the nature of the polymerization taking place in such reactors. Preferably, the polymerization temperature for polymers comprising predominantly (e.g., 50 wt % or more) ethylene derived units is at least 100° C., or at least 150° C., or even 200° C. or more, varying from desired polymers. The temperature preferably does not exceed the polymerization decomposition temperature or the temperature at which the catalyst can sustain the polymerization reaction.

Overall, the exotherm may lead to a temperature differential between the inlet temperature of the polymerization reactor and the outlet temperature of from 50° C. to 220° C. or up to 250° C. In one or more preferred embodiments, by feeding at minus 40° C. and allowing the exotherm to raise the temperature to 210° C., a highly efficient process may result for producing lower molecular weight polymers. For higher molecular weight polymers, the temperature rise may need to be constrained via warmer feed and/or lower reactor temperatures to avoid excessive viscosity in the reactor solution that would degrade reactor mixing performance, thereby leading to non-uniform polymers.

Monomer concentration may depend on the types of target polymer and molecular weight, the associated conversions of monomer to polymer and the operating temperature. Preferably, the monomer concentration is higher than 10 wt %, or 15 wt %, and preferably lower than 80 wt %, 70 wt %, or 60 wt %. The total vapor pressure of all components may be less than 100 wt % of the reactor pressure at the stream temperature to avoid formation of vapor bubbles. In general, higher monomer concentrations are preferred to improve the liquid phase separation in the liquid phase separator.

The invention(s) described herein can be performed with any suitable catalysts, for example, a Ziegler Natta catalyst, a single sited catalyst (SSC) or metallocene catalyst. In one or more preferred embodiments, a SSC or metallocene catalyst can be used. For the purposes of this patent specification the term "metallocene" is herein defined to contain one or more cyclopentadienyl moiety in combination with a transition metal of the Periodic Table of Elements. These generally contain a transition metal of Groups 3 to 10 of the Periodic Table; and at least one ancillary ligand that remains bonded to the transition metal during polymerization. Preferably, the transition metal is used in a cationic state and stabilized by a cocatalyst or activator. Especially preferred are metallocenes of Group 4 of the Periodic Table such as titanium, hafnium or zirconium which are used in polymerization in the monovalent cationic state and have one or two ancillary ligands as described in more detail hereafter. The important features of such catalysts for coordination polymerization would be the ligand capable of abstraction and that ligand into which the ethylene (olefinic) group can be inserted.

Preferably, the catalyst is a bulky ligand transition metal catalyst. The "bulky ligand" contains a multiplicity of bonded atoms, preferably carbon atoms, forming a group, which may be cyclic with one or more hetero-atoms. The bulky ligand may be metallocene-type cyclopentadienyl derivative, which can be mono- or poly-nuclear. One or more bulky ligands may be bonded to the transition metal atom. The bulky ligand can be assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It can be assumed that detachment of any such ligand leads to the creation of a coordination site at which the olefin monomer can be inserted into the polymer chain. Preferably, the transition metal atom is a Group 4, 5 or 6 transition metal of the Periodic Table of Elements. More preferably, the transition metal atom is a Group 4 atom.

Metallocene catalysts can be used with a cocatalyst which may be alumoxane, preferably methylalumoxane having an average degree of oligomerization of from 4 to 30 as determined by vapor pressure osmometry. Alumoxane may be modified to provide solubility in linear alkanes or be used in slurry, but can be generally used from a toluene solution. Such solutions may include unreacted trialkyl aluminum and the alumoxane concentration can be generally indicated as mol Al per liter, which figure includes any trialkyl aluminum which has not reacted to form an oligomer. The alumoxane, when used as cocatalyst, can be generally used in molar excess, at a mol ratio of 50 or more, preferably 100 or more, and preferably 1000 or less, preferably 500 or less, relative to the transition metal.

The SSC may preferably be selected from among a broad range of available SSCs to suit the type of polymer being made and the process window associated therewith in such a way that the polymer can be produced under the process conditions at an activity of at least 40,000 g polymer per gram SSC (or a metallocene), preferably at least 60,000 or even in excess of 100,000 g polymer per gram SSC. By enabling the different polymers to be produced in different operating windows with an optimized catalyst selection, the SSC and any ancillary catalyst components can be used in small quantities, with optionally also using small amounts of scavengers. The killer can be used in equally small amounts and the various cost-effective methods can then be introduced to allow the non-polar solvent to be recycled and subjected to treatment to remove polar contaminants before re-use in the polymerization reactor(s).

A metallocene may be also used with a cocatalyst which can be a non-coordinating anion (the term "non-coordinating anion" as used herein includes weakly coordinated anions, and the coordination may be sufficiently weak in any event as evidenced by the progress of polymerization to permit the insertion of the unsaturated monomer component). The non-coordinating anion may be supplied and reacted with the metallocene in any of the manners described in the art.

The precursor for the non-coordinating anion may be used with a metallocene supplied in a reduced valency state. The precursor may undergo a redox reaction. The precursor may be an ion pair of which the precursor cation can be neutralized and/or eliminated in some manner. The precursor cation may be an ammonium salt as in EP 0277003 and EP 0277004. The precursor cation may be a triphenylcarbonium derivative.

The non-coordinating anion can be a halogenated, tetraaryl-substituted Group 10-14 non-carbon element-based anion, especially those that have fluorine groups substituted for hydrogen atoms on the aryl groups, or on alkyl substituents on those aryl groups.

The effective Group 10-14 element cocatalyst complexes, in a preferable embodiment, derived from an ionic salt, comprise a 4-coordinate Group 10-14 element anionic complex, where the anion can be represented as:

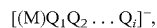
$[(M)Q_1Q_2 \ldots Q_i]^-$, where M is one or more Group 10-14 metalloid or metal, preferably boron or aluminum, and each Q is a ligand effective for providing electronic or steric effects rendering $[(M')Q_1Q_2 \ldots Q_n]^-$ suitable as a non-coordinating anion as that is understood in the art, or a sufficient number of Q are such that $[(M')Q_1Q_2 \ldots Q_n]^-$ as a whole is an effective non-coordinating or weakly coordinating anion. Exemplary Q substituents specifically include fluorinated aryl groups, preferably perfluorinated aryl groups, and include substituted Q groups having substituents additional to the fluorine substitution, such as fluorinated hydrocarbyl groups. Preferred fluorinated aryl groups include phenyl, biphenyl, naphthyl and derivatives thereof.

The non-coordinating anion may be used in approximately equimolar amounts relative to the transition metal component, such as at least 0.25, preferably 0.5, and especially 0.8 and such as no more than 4, preferably 2 and especially 1.5.

Representative metallocene compounds can have the formula:

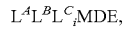
$L^A L^B L^C_i MDE$, where $L^A$ is a substituted cyclopentadienyl or hetero-cyclopentadienyl ancillary ligand π-bonded to M; $L^B$ is a member of the class of ancillary ligands defined for $L^A$, or is J, a hetero-atom ancillary ligand σ-bonded to M; the $L^A$ and $L^B$ ligands may be covalently bridged together through a Group 14 element linking group; $L^C_i$ is an optional neutral, non-oxidizing ligand having a dative bond to M (i equals 0 to 3); M is a Group 4 or 5 transition metal; and, D and E are independently mono-anionic labile ligands each having a σ-bond to M, optionally bridged to each other or $L^A$ or $L^B$. The mono-anionic ligands are displaceable by a suitable activator to permit insertion of a polymerizable monomer or macro-monomer for coordination polymerization on the vacant coordination site of the transition metal component.

Representative non-metallocene transition metal compounds usable as SSCs also include tetrabenzyl zirconium, tetra bis(trimethylsiylmethyl) zirconium, oxotris(trimethlsilylmethyl) vanadium, tetrabenzyl hafnium, tetrabenzyl titanium, bis(hexamethyl disilazido)dimethyl titanium, tris(trimethyl silyl methyl) niobium dichloride, and tris (trimethylsilylmethyl) tantalum dichloride.

Additional organometallic transition metal compounds suitable as olefin polymerization catalysts in accordance with the aspects described herein will be any of those Group 3-10 that can be converted by ligand abstraction into a catalytically active cation and stabilized in that active electronic state by a non-coordinating or weakly coordinating anion sufficiently labile to be displaced by an olefinically unsaturated monomer such as ethylene.

More preferred are metallocenes which are biscyclopentadienyl derivatives of a Group 4 transition metal, preferably zirconium or hafnium, for example, as disclosed in WO 99/41294. These may advantageously be derivatives containing a fluorenyl ligand and a cyclopentadienyl ligand connected by a single carbon and silicon atom, for example, as disclosed in WO 99/45040 and WO 99/45041. More preferably, the Cp ring is unsubstituted and/or the bridge contains alkyl substituents, suitably alkylsilyl substituents to assist in the alkane solubility of the metallocene, for example as disclosed in WO 00/24792 and WO 00/24793. Other possible metallocenes include those in WO 01/58912.

EP 0418044 incorporated herein by reference discloses a monocyclopentadienyl compound similar to that of EP 0416815. Similar compounds are described in ExxonMobil Patent No. EP 0420436. WO 97/03992 incorporated herein by reference shows a catalyst in which a single Cp species and a phenol are linked by a C or Si linkage, such as $Me_2C(Cp)$ (3-tBu-5-Me-2-phenoxy)$TiCl_2$. WO 2001/05849 incorporated herein by reference discloses Cp-phosphinimine catalysts, such as $(Cp)((tBu)_3P=N-)TiCl_2$.

Other suitable metallocenes may be bisfluorenyl derivatives or unbridged indenyl derivatives which may be substituted at one or more positions on the fused ring with moieties which have the effect of increasing the molecular weight and indirectly permits polymerization at higher temperatures such as described in EP 0693506 and EP 0780395, both of which are incorporated herein by reference.

When using the catalysts described above, the total catalyst system will generally additionally comprise one or more organometallic compounds as scavenger(s). Such compounds as used in this application are meant to include those compounds effective for removing polar impurities from the reaction environment and for increasing catalyst activity. Impurities can be inadvertently introduced with any of the polymerization reaction components, particularly with solvent, monomer and catalyst feed, and adversely affect catalyst activity and stability. It can result in decreasing or even eliminating catalytic activity, particularly when ionizing anion precursors activate the catalyst system. The impurities, or catalyst poisons include water, oxygen, polar organic compounds, metal impurities, etc. Preferably, steps are taken to remove these poisons before introduction of such into the reaction vessel, for example by chemical treatment or careful separation techniques after or during the synthesis or preparation of the various components, but some minor amounts of organometallic compound will still normally be used in the polymerization process itself.

Typically, these compounds will be organometallic compounds such as the Group-13 organometallic compounds of U.S. Pat. Nos. 5,153,157 and 5,241,025, International Publication Nos. WO 91/09882, WO 94/03506, WO 93/14132, and WO 95/07941. Exemplary compounds include triethyl aluminum, triethyl borane, tri-isobutyl aluminum, tri-n-octyl aluminum, methylalumoxane, and isobutyl alumoxane. Alumoxane also may be used in scavenging amounts with other means of activation, e.g., methylalumoxane and tri-isobutyl-aluminoxane with boron-based activators. Preferably, the amount of such compounds to be used with catalyst compounds is minimized during polymerization reactions to that amount effective to enhance activity (and with that amount necessary for activation of the catalyst compounds if used in a dual role) since excess amounts may act as catalyst poisons.

The invention as explained above permits polymerizations of a wide variety of polymer types and molecular weights. Generally speaking, the polymers are derived from either ethylene or propylene as the dominant (e.g., more than 50 wt %) component. Polymers may preferably contain from 5 mol % to 40 mol % of comonomers to vary crystallinity and flexibility. The comonomers may be alpha-olefins (under which term cyclic olefins such as styrene are included) having from 2 to 20 carbon atoms, such as ethylene (in the case of the polymer consisting predominantly of propylene derived units), propylene, 1-butene, 1-hexene, and 1-octene. Amounts of dienes such as hexadiene, vinyl norbornene, ethylidene norbornene (ENB), norbornadiene, etc., may be included to promote unsaturation and/or the formation of longer branches themselves made from polymerized monomer derived units.

In the case of plastomer, the polymer which may be produced includes the following aspects: the comonomer is preferably an alpha-olefin having from 3 to 15 carbon atoms, more preferably 4 to 12 carbon atoms, and more preferably 4 to 10 carbon atoms. Ethylene can be polymerized with at least two comonomers to form a terpolymer. Ethylene is preferably polymerized in a proportion of 70 mol % to 99.99 mol %, preferably from 70 mol % to 97 mol % and more preferably 80 mol % to 95 mol % of ethylene with 0.01 mol % to 30 mol %, preferably 3 mol % to 30 mol % and more preferably from 5 mol % to 20 mol % comonomer. For the purposes of this patent specification, the molecular weight distribution of a polymer can be determined with a Waters Gel Permeation Chromatograph equipped with Ultra-styrogel columns and a refractive index detector. The operating temperature of the instrument can be set at 145° C., the eluting solvent was trichlorobenzene, and the calibration standards included sixteen polystyrenes of precisely known molecular weight, ranging from a molecular weight of 500 to a molecular weight of 5.2 million, and a polyethylene standard, NBS 1475.10. The molecular weight distribution of the plastomers produced in this embodiment are termed "narrow", that is, an Mw/Mn can be less than or equal to 3, preferably less than or equal to 2.5. The MI of the polymers can be from 0.01 dg/min to 200 dg/min, preferably 0.1 dg/min to 100 dg/min, more preferably 0.2 dg/min to 50 dg/min and more preferably less than 10 dg/min. Contemplated densities of the plastomers are in the range of 0.85 $g/cm^3$ to 0.93 $g/cm^3$, preferably 0.87 $g/cm^3$ to 0.92 $g/cm^3$, and more preferably 0.88 $g/cm^3$ to 0.91 $g/cm^3$.

The processes described herein may be especially concerned with copolymerization reactions involving the polymerization of one or more of the monomers, for example alpha-olefin monomers of ethylene, propylene, 1-butene, 1-pentene, 1,4-methyl-1-pentene, 1-hexene, 1-octene, 1-decene and cyclic olefins such as styrene. Other monomers may include polar vinyl, dienes, norbornene, acetylene, and aldehyde monomers.

In the case of elastomer, the polymer which may be produced includes an ethylene-α-olefin-diene elastomer (EODE) of high Mw and a diene content of greater than 0.3 wt %, preferably greater than 2 wt %. These polymers may be largely amorphous and have a low or zero heat of fusion. As used herein, the term "EODE" encompasses elastomeric polymers comprised of ethylene, α-olefin, and one or more non-conjugated diene monomers. The non-conjugated diene monomer may be a straight chain, branched chain or cyclic hydrocarbon diene having from 6 to 15 carbon atoms. Examples of suitable non-conjugated dienes are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene.

Of the dienes typically used to prepare ethylene-propylene-diene elastomers (EPDMs), the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD). The preferred EOD elastomers may contain 20 wt % up to 90 wt % ethylene, more preferably 30 wt % to 85 wt % ethylene, and more preferably 35 wt % to 80 wt % ethylene, based on the weight of EOD elastomer. The alpha-olefin suitable for use in the preparation of elastomers with ethylene and dienes are preferably propylene, 1-butene, 1-pentene, 1-hexene, 1-octene and 1-dodecene. Preferably, the alpha-olefin is incorporated into the EODE polymer at 10 wt % to 80 wt %, more preferably at 20 wt % to 65 wt %, based on the weight of the EODE polymer. The non-conjugated dienes are generally incorporated into the EODE at 0.5 wt % to 20 wt %; more preferably at 1 wt % to 15 wt %, and more preferably at 2 wt % to 12 wt %, based on the weight of the EODE polymer. If desired, more than one diene may be incorporated simultaneously, for example HD and ENB, with total diene incorporation within the limits specified above.

In one or more embodiments, the elastomers may also be a copolymer of two monomers. Such copolymers may be elastomers of relatively high Mw, low crystallinity, and low ash. The copolymers may be ethylene-alpha-olefin-copolymers of high Mw. The ethylene-alpha-olefin-copolymers may be copolymers of ethylene and an alpha-olefin, not necessarily propylene, which exhibits the properties of an elastomer. The alpha-olefins suitable for use in the preparation of elastomers with ethylene are preferably $C_3$ to $C_{10}$ alpha-olefins. Illustrative non-limiting examples of such alpha-olefins are propylene, 1-butene, 1-pentene, 1-hexene, 1-octene and 1-dodecene. If desired, more than one alpha-olefin may be incorporated. The ethylene-alpha-olefin-copolymers may contain 20 wt % up to 90 wt % ethylene, more preferably 30 wt % to 85 wt % ethylene, and more preferably 35 wt % to 80 wt % ethylene.

In one or more embodiments, the elastomers may be propylene-based polymers having predominantly (50 wt % or more) of propylene derived units.

In one or more preferred embodiments, the propylene-based polymers are comprised of propylene and at least one comonomer, and optionally a diene. The comonomer may be ethylene or an alpha-olefin. Comonomers include ethylene and linear or branched $C_4$ to $C_{30}$ alpha-olefins, or combinations thereof. Preferred linear alpha-olefins include ethylene and $C_4$ to $C_8$ alpha-olefins, more preferably ethylene, 1-butene, 1-hexene, and 1-octene, even more preferably ethylene or 1-butene. Preferred branched alpha-olefins include 4-methyl-1-pentene, 3-methyl-1-pentene, and 3,5,5-trimethyl-1-hexene. The propylene copolymer is preferably a random copolymer, as the term is defined herein below. A diene may also be comprised in the propylene-based polymer. Preferably, diene comprises non-conjugated dienes which are straight chain acyclic dienes such as 1,4-hexadiene and 1,6-octadiene; branched chain acyclic dienes such as 5-methyl-1,4-hexadiene; 3,7-dimethyl-1,6-octadiene; 3,7-dimethyl-1,7-octadiene and mixed isomers of dihydromyricene and dihydroocinene; single ring alicyclic dienes such as 1,4-cyclohexadiene and 1,5-cyclododecadiene; and multi-ring alicyclic fused and bridged ring dienes such as tetrahydroindene, methyl tetrahydroindene, dicyclopentadiene; bicyclo-1,5-(2,2,1)-hepta-2,5-diene; alkenyl, alkylidene, cycloalkylidene norbornenes such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene and norbornadiene. The propylene-based polymer may comprise 1,4-hexadiene (HD), 5-ethylidene-2-norbornene (ENB), 5-vinylidene-2-norbornene (VNB), 5-methylene-2-norbornene (MNB), and dicyclopentadiene (DCPD).

Preferably the propylene-based polymer may have a crystallinity of from 2% to 65%. Within this range of crystallinity, alternative lower limits of crystallinity can be 5% or 10% or 15%, and alternative upper limits of crystallinity may be 50%, 45%, or 40%. The crystallinity of the propylene-based polymer is derived from isotactic (or alternatively syndiotactic) polypropylene sequences in the copolymer. Preferably, the amount of propylene may be from 65 wt % to 95 wt %. Within the range, alternative lower limits of propylene content may be 70 wt %, or 80 wt %, and alternative upper limits of propylene content can be 92.5 wt %, 90 wt %, or 89 wt %.

The semi-crystalline propylene-based polymer has a non-zero heat of fusion due to the measurable crystallinity. The crystallinity may be calculated from the heat of fusion using a preferred value of 189 J/g for 100% crystallinity and a linear relationship between heat of fusion and crystallinity (see, B. Wunderlich, Macromolecular Physics, Vol. 3, Academic Press (1980), esp. Chapter 8.4.2).

The propylene-based polymer preferably has a single broad melting transition. Typically, a sample of the propylene-based polymer will show secondary melting peaks or shoulders adjacent to the principal peak, and this combination is considered together as single melting point, i.e., a single broad melting transition. The highest of these peaks is considered the melting point. The propylene-based polymer preferably has a melting point of from 25° C. to 110° C. Within this range, alternative lower limits of the melting point may be 30° C., or 35° C., and alternative upper limits of the melting point may be 105° C. or 90° C.

In case of EODMs or EPDMs elastomer, preferably, the elastomer may have a weight average molecular weight of from 80,000 to 500,000. In one or more preferred embodiments, the elastomers have a Mooney viscosity ML (1+4) @125° C., as determined by ASTM-D 1646, less than 100, more preferably less than 75, even more preferably less than 60, and more preferably less than 30. In the same or different embodiments, the EODMs or EPDMs elastomer may have a viscosity measured by ASTM-D 3236 at 190° C. of greater than 0.01 Pa·s, or greater than 0.05 Pa·s. In case of the propylene-based polymers, preferably, the propylene-based polymer may have a weight average molecular weight of from 10,000 to 80,000, preferably from 20,000 to 80,000. In the same or different embodiments, the propylene-based polymer may have a viscosity measured by ASTM-D 3236 at 190° C. of or less than 0.05 Pa·s or less than 0.01 Pa·s. The MWD ($M_w/M_n$) of the propylene-based polymer may be less than 40, more preferably less than 5, or less than 4, or less than 3. Preferably, the lower limit of the MWD is greater than 0.5, or greater than 1, or greater than 1.5, or greater than 1.8.

The propylene-based polymer can be a random crystallizable copolymer having a narrow compositional distribution. The intermolecular composition distribution of the polymer is determined by thermal fractionation in a solvent. A typical solvent is a saturated hydrocarbon, such as hexane or heptane. The thermal fractionation procedure is described below. Typically, approximately 75 wt % and more preferably 85 wt % of the polymer is isolated as one or two adjacent soluble fractions with the balance of the polymer in immediately preceding or succeeding fractions. Each of these fractions has a composition (wt % ethylene content) with a difference of not greater than 20% (relative) and more preferably not greater than 10% (relative) from the average weight % ethylene content of the propylene-based polymer. For purposes of the present invention, the propylene-based polymer can be considered to have a "narrow" compositional distribution if it meets the fractionation test outlined above.

The length and distribution of stereoregular propylene sequences in preferred propylene-based polymers is consistent with substantially random statistical copolymerization. It is well known that sequence length and distribution are related to the copolymerization reactivity ratios. As used herein, the term "substantially random" means a copolymer for which the product of the reactivity ratios is generally 2 or less. In contrast, in stereoblock structures, the average length of PP sequences is greater than that of substantially random copolymers with a similar composition. Prior art polymers with stereoblock structure have a distribution of PP sequences consistent with these "blocky" structures rather than a random, substantially statistical distribution.

The reactivity ratios and sequence distribution of the polymer may be determined by C-13 NMR which locates the ethylene residues in relation to the neighboring propylene residues. To produce a crystallizable copolymer with the required randomness and narrow composition distribution, it may be desirable to use (1) a single-sited catalyst and (2) a well-mixed, continuous flow, stirred tank polymerization reactor which allows only a single polymerization environment for substantially all of the polymer chains of preferred propylene-based polymers.

Preferred propylene-ethylene copolymers are described in U.S. Pat. No. 6,635,715, the contents of which are hereby incorporated by reference.

Generally, when the molecular weight of the polymers is too low, liquid phase separation in the manner described herein may be hindered or made inefficient as an excessive amount of polymer might then be carried over in the lean phase. The precise boundary depends on solvent composition and polymer composition as well as molecular weight. A rapid pressure let-down, generally greater than 2 MPa/second, preferably 3 MPa/second or more, more preferably 4 MPa/second or more, even more preferably 5 MPa/second or more, assists in inducing disengagement of the two phases. This rapid pressure decrease preferably starts from a pressure above the binodal boundary or LCST and stops at a pressure below the spinodal boundary. The preferred phase separation can be by spinodal decomposition and is called pressure induced phase separation (PIPS). Also preferably the first separator provides a sufficient residence time to permit the settlement of the lean and the polymer-rich phase at the lower end of the separator.

Molecular weight control may be exercised through control of hydrogen levels which may be supplementary to control of molecular weight by control of the polymerization temperature.

The lean phase may be passed in liquid form to an apparatus for removing hydrogen added to or generated during polymerization, which apparatus may comprise an unit for contacting a stripping vapor with the lean phase in a countercurrent flow arrangement to concentrate the hydrogen in the vapor phase for removal from the lean phase recycle.

The stripping vapor preferably consists of a volatile monomer such as ethylene. Optionally an inert gas, such as nitrogen, may be used. The stripping vapor may include a stripping vessel to remove hydrogen from the recovered solvent stream for use as the polymerization feed. The stripping vapor preferably has low hydrogen content, preferably below 5 ppm by mol. The stripping vapor may be selected to be more volatile than other monomer or solvent components, be substantially devoid of contaminants that are deleterious to the polymerization catalysts, be recoverable in the plant recovery system, and preferably be available at high enough supply pressure for introduction into the stripping vessel without the aid of separate additional compression.

EXAMPLE

Now embodiments will be described below in combination with the Figures.

Polymerization and Initial Separation of Polymer and Solvent

A feed for polymerization is passed through conduit 2 by a centrifugal pump 3. The feed contains: A) isohexane as solvent; B) monomer, generally the predominant monomer is ethylene or propylene; C) comonomer which may be any copolymerizable alpha-olefin; and optionally D) a diene or other polyene or cyclic copolymerizable material. The feed is passed through a chiller or cooler 6 in which the feed is optionally chilled to a low temperature for subsequent adiabatic polymerization in the two continuous stirred tank reactors 8 which are operated in series or parallel (for simplicity, only one reactor is depicted in FIGS. 1 to 3). Activator and metallocene catalyst may be premixed and added at 5 and/or 7 to one or both reactors 8. A scavenger, generally in the form of an alkyl aluminum such as tri-isobutyl aluminum or tri-n-octyl aluminum is added at conduit 4 to minimize the impact of poisons in the feed and in the reactor on the catalyst activity.

To complement the molecular weight control provided by controlling the polymerization temperature, hydrogen may be added to one or both reactors through conduits (not shown).

The polymer-containing reaction mixture which emerges from the reactors 8 through a conduit 11 is treated with a catalyst killer, preferably water or methanol, added to element 10 to terminate the polymerization reaction. A heat exchanger 12 is arranged as part of a heat integrating arrangement and heated by a lean phase emerging from an upper layer 20 in a first separator (or liquid phase separator) 14, and provides an initial increase in the temperature of the reaction mixture in the conduit 11. A trim heat exchanger 16 operating by using steam, hot oil or other high temperature fluid, further increases the temperature to a level suitable for liquid phase separation. The reaction mixture then passes through a letdown valve 18 where a pressure drop is created which causes the separation of the reaction mixture and settlement into the lean phase 20 and a first polymer-rich phase below it.

It is important to note that an energy-consuming pump is not required to provide a pressure increase in the conduit 11 between the reactors 8 and the separator 14 as the polymer-containing reaction mixture is propelled by the pressure from the pump 3.

Treatment of the Polymer-Rich Phase

Now with reference to FIG. 1, the subsequent treatment of the first polymer-rich phase is described. The first polymer-rich phase 22 from the first separator is passed through a temperature adjustment unit 231, for example in the form of a heat exchanger, and then passed to a second separator 34, for example in the form of flash tank 34, which has a lower pressure than the first separator. In the second separator, evaporated solvent and monomer are separated from the first polymer-rich phase.

The temperature of the first polymer-rich phase is increased or decreased by at least 1° C., or at least 3° C., or at least 5° C., or at least 10° C. after passing through the heat exchanger 231. For the purposes of reducing the volatile component(s) in polymers, for example, especially with higher viscosity, the temperature of the first polymer-rich phase is increased after passing through the heat exchanger 231, and on the other hand for the purpose of improving pelletization rate of polymer, for example especially with lower viscosity in the finishing stage, the temperature of the first polymer-rich phase is decreased after passing through the heat exchanger 231. The temperature of the polymer-rich phase may be increased as high as possible but lower than the degradation temperature of polymers. On the other hand, the temperature of the polymer-rich phase may be decreased as low as possible but higher than the crystallization temperature of the polymers. Preferably, the heated or cooled first polymer-rich phase from the heat exchanger 231 is kept still in solution.

The evaporated solvent and monomer phase is passed through conduit 35 in a vapor phase to the purification tower 36 operating by distillation to separate a light fraction of the highly volatile solvent and unreacted ethylene and propylene on the one hand and heavier less volatile component(s) such as hexane and any toluene used to dissolve catalyst or activator and unreacted diene type comonomers on the other hand. Use of toluene may be reduced under appropriate circumstances by a suitable selection of catalyst components and catalyst preparation conditions, such as increases in catalyst solution temperature to increase the solubility of the catalyst components to reach a point where so little toluene is present that no separate process for the removal of the toluene is required.

A gear pump 38 conveys the second polymer-rich phase through a short conduit to a vacuum devolatilizing extruder or mixer 40. Molten stabilizer optionally can be injected into the short conduit. The stream of second polymer-rich phase then enters the inlet of vacuum devolatilizer 40 where again a vapor phase is drawn off for purification, condensed and then pumped to a purification tower 50. A heavy fraction of toluene used as catalyst solvent and diene such as ethylene norbornadiene (ENB) comonomer or 1-octene comonomer are recovered by this purification tower 50. The ENB or octene may be recycled through outlet 54. Alternative heavy comonomers, such as ENB and octene, may thereby be stored in separate storage vessels 55, 56, which facilitates rapid product transitions between different product families (e.g., EP(D)M and EO plastomers), while still enabling eventual recovery of the valuable unreacted comonomers. This capability further enhances the flexibility of this process to produce a wide variety of dissimilar products.

Emerging from the vacuum devolatilizer 40, the second polymer-rich phase flows into a shaft provided with a screw flight or impeller which drives the polymer along the shaft and into an underwater pelletizer fed with water chilled at 42. The polymer pellets are washed and spun dried at 44 to form pellets suitable for bagging or baling at 46.

The level of the second polymer-rich phase in the flash tank 34 is monitored by a nuclear radiation sensor (not shown) and the drive of gear pump 38 is controlled to keep the level within set limits. The drive of pump 107 is controlled so that the flow rate of stabilizer is directly proportional to the speed of gear pump 38.

In the treatment of the polymer-rich phase as embodied in FIG. 2, no heat exchanger is arranged downstream of the first separator and upstream of the second separator, but the heat exchanger 232 is located downstream of the second separator and upstream of the devolatilizer. In this example, the first polymer-rich phase is passed to the second separator 34 which has a lower pressure than that of the first separator. The second polymer-rich phase from the bottom of the second separator 34 is passed to the heat exchanger 232 in which the temperature of the second polymer-rich phase may be increased or decreased. The heated or cooled second polymer-rich phase is then conveyed by gear pump 38 through a short conduit to a vacuum devolatilizer 40.

In the treatment of the polymer-rich phase as embodied in FIG. 3, the heat exchanger 231 is located downstream of the first separator and upstream of the second separator and the heat exchanger 232 is located downstream of the second separator 34 and upstream of the devolatilizer 40. In this example, the first polymer-rich phase is passed to the heat exchanger 231 in which the temperature of the second polymer-rich phase is increased or decreased, and then passed to the second separator 34 which has a lower pressure than that of the first separator. The second polymer-rich phase from the second separator 34 is passed to the heat exchanger 232 in which the temperature of the second polymer-rich phase is increased or decreased. The temperature of the first and the second polymer-rich phases can be increased or decreased. The heated or cooled second polymer-rich phase is then conveyed by gear pump 38 through a short conduit to a vacuum devolatilizer 40. In this example, the heat exchangers 231 and 232 both can be used for increasing the temperature of the first and the second polymer-rich phase, or both can be used for decreasing the temperature of the first and the second polymer-rich phase, or one can be used for increasing the temperature of the first or the second polymer-rich phase and the other can be used for decreasing the temperature of the second or the first polymer-rich phase. In one preferred embodiment, the heat exchanger 231 is used for increasing the temperature of the first polymer-rich phase and the temperature 232 is used for decreasing the temperature of the second polymer-rich phase.

Polymerization of Different Polymers

The operation of the plant can be as described in Table 1, which exemplifies polymerization processes to make a low molecular weight plastomer; a higher molecular weight elastomer and a lower molecular weight propylene-based polymer.

fed to the separator 14. After further removal of solvent and monomer in the second separator 34, the second polymer-rich phase is passed through a heat exchanger and the temperature

TABLE 1

Process Conditions of the Plant/Process in Varying Operating Modes

|  | Plastomer | Elastomer | Propylene-based polymer |
|---|---|---|---|
| Feed into reactor | 50 or down to −15° C.; 12 MPa total; 5 MPa monomer partial pressure | 50 or down to −15° C.; 12 MPa total; 5 MPa monomer partial pressure | 50 or down to −15° C.; 12 MPa total; 5 MPa monomer partial pressure |
| Polymerization inside reactor | 150-200° C.; 10-13 MPa; 7-22 wt % polymer | 85-150° C.; 10-13 MPa; 8-15 wt % polymer | 50-80° C.; 10-13 MPa; 5-15 wt % polymer |
| Reaction mixture upstream let-down valve | 220° C.; 10-13 MPa; 15-22 wt % polymer | 220° C.; 10-13 MPa; 8-15 wt % polymer | 200° C.; 10-13 MPa; 5-15 wt % polymer |
| Reaction mixture downstream let down valve | 220° C.; 3-4.5 MPa; 15-22 wt % polymer | 220° C.; 3-4.5 MPa; 8-15 wt % polymer | 200° C.; 3-4.5 MPa; 5-15 wt % polymer |
| First polymer-rich phase | 220° C.; 3-4 MPa; 25-40 wt % polymer | Upstream heat exchanger: 220° C.; 3-4 MPa; 25-40 wt % polymer | Upstream heat exchanger: 220° C.; 3-4 MPa; 20-40 wt % polymer |
|  | Downstream heat exchanger: 200° C.-100° C.; 0.5-2 MPa; 30-50 wt % polymer | Downstream heat exchanger: 230° C.; 3-4 MPa; 25-40 wt % polymer | Downstream heat exchanger: 230° C.; 3-4 MPa; 20-40 wt % polymer |
| Second polymer-rich phase | Upstream heat exchanger: 200° C.-100° C.; 0.5-2 MPa; 30-50 wt % polymer | 230° C.; 0.5-2 MPa; 30-50 wt % polymer | Upstream heat exchanger: 230° C.; 3-4.5 MPa; 25-50 wt % polymer Downstream heat exchanger: 200-100° C.; 3-4.5 MPa; 25-50 wt % polymer |
| Level of volatile component(s) | Less than 0.06 wt % | Less than 0.06 wt % | Less than 0.06 wt % |
| Pelletization rate | 5-25 T/hr/Train | 3-25 T/hr/Train | 5-25 T/hr/Train |

To make a plastomer in the plant of FIG. 1, the feed temperature is reduced by the chiller 6 to a temperature of about 0° C. Aluminum alkyl is added as scavenger in amounts appropriate to the poison content of the feed. The pressure is raised by the centrifugal pump to 12 MPa. The feed comprising largely of solvent and up to 5 MPa partial pressure of ethylene and butene or hexene or octene comonomer then enters the reactor(s) 8. Catalyst and activator is added to the reactor(s) 8 in amounts to create the desired polymerization temperature which in turn is related to the desired molecular weight. The heat of polymerization increases the temperature to 150° C. to 200° C. to form a plastomer without the use of hydrogen (although ¾ may be used). At the outlet of the reactor(s), the polymer concentration is in the range of from 15 wt % to 22 wt %. The general conditions may be as described in WO 99/45041.

Water is then supplied at element 10 to kill the polymerization reaction which might otherwise continue in the presence of surviving catalyst, unreacted monomer, and elevated temperature.

The heat exchanger 12 raises the temperature initially and then the further heat exchanger 16 causes a further temperature rise to 220° C. A rapid pressure drop results as the reaction mixture passes through the let-down valve 18 into the first separator, with the pressure dropping quickly from 10 MPa to 4 MPa. The pressure differential between that at the outlet of the pump 3 and the outlet of the let-down valve 18 is responsible for causing the feed and the reaction mixture to flow through the reactor(s) 8 and the conduit 11 including the heat exchangers 12 and 16.

Inside the first separator 14, an upper lean phase is formed with less than 0.1 wt % of polymer and a first polymer-rich phase with 25 wt % to 40 wt % of polymer. The concentration is approximately double to triple that of the reaction mixture is decreased to 200° C. and then pumped through gear pump 38 to a devolatilizer 40. Polymer leaving the devolatilizer 40 may contain less than 1 wt %, preferably with 0.5 wt % or less, even more preferably less than 0.06 wt % of volatile component(s), including water. The pelletization rate in the pelletization stage can be from 3 to 25 T/Hr/Train, preferably from 5 to 25 T/Hr/Train, or from 8 to 25 T/Hr/Train, or from 10 to 25 T/Hr/Train. With two reactors in series, the disclosure of WO 99/45047 (Harrington et al.) may be used, the contents of which is incorporated herein by reference.

The same may be said of the columns in Table 1 marked "elastomer" where the temperature of the first polymer-rich phase is increased to 230° C. and "propylene-based polymer" where the temperature of the first polymer-rich phase is increased to 230° C. and then the temperature of the second polymer-rich phase is decreased to 200° C. to 100° C. The general conditions described in WO 00/01745, the contents of which is incorporated herein by reference, may be used. In the runs, the polymerization temperature varied between 28° C. and 70° C.

Having described the various aspects of the present invention herein, further specific embodiments of the invention include those set forth in the following paragraphs:

Paragraph 1. A process of forming a polymer comprising the steps of:
(a) supplying a feed having one or more olefin monomer(s) and a solvent;
(b) contacting the feed with a catalyst to form a reaction mixture;
(c) treating the reaction mixture to form a first polymer-rich phase;
(d) treating the first polymer-rich phase to form a second polymer-rich phase;

(e) devolatilizing the second polymer-rich phase to obtain the polymer; and (x) adjusting between step (c) and step (e) the temperature of the first or the second polymer-rich phase.

Paragraph 2. The process of Paragraph 1, wherein step (x) is between step (c) and step (d).

Paragraph 3. The process of Paragraph 1, wherein step (x) is between step (d) and step (e).

Paragraph 4. The process of Paragraph 2 further comprising a step (y) between step (d) and step (e) for adjusting the temperature of the second polymer-rich phase.

Paragraph 5. The process of any of Paragraphs 1 to 4, wherein step (x) is for increasing the temperature of the first or the second polymer-rich phase.

Paragraph 6. The process of any of Paragraphs 1 to 4, wherein step (x) is for decreasing the temperature of the first or the second polymer-rich phase.

Paragraph 7. The process of Paragraph 4, wherein step (y) is for increasing the temperature of the second polymer-rich phase.

Paragraph 8. The process of Paragraph 4, wherein step (y) is for decreasing the temperature of the second polymer-rich phase.

Paragraph 9. The process of Paragraph 5, wherein the polymer has a viscosity greater than 0.01 Pa·s as measured by ASTM-D3236 at 190° C. and a ML (1+4, 125° C.) less than 100 as measured by ASTM-D1646.

Paragraph 10. The process of Paragraph 6, wherein the polymer has a viscosity measured by ATSM-D3236 at 190° C. of less than 0.01 Pa·s.

Paragraph 11. The process of any of Paragraphs 1 to 10, wherein step (c) is carried out under a pressure greater than 2 MPa and less than 15 MPa.

Paragraph 12. The process of any of Paragraphs 1 to 11, wherein step (d) is carried out under a pressure greater than 0.05 MPa and less than 2 MPa.

Paragraph 13. The process of any of Paragraphs 1 to 12, wherein the polymer obtained in step (e) comprises less than 0.1 wt % of volatile component(s).

Paragraph 14. The process of any of Paragraphs 1 to 13, wherein step (d) is operated in a vacuum.

Paragraph 15. The process of any of Paragraphs 1 to 14, wherein the olefin monomers comprise propylene and at least one comonomer selected from the group consisting of ethylene and $C_4$ to $C_8$ alpha-olefins.

Paragraph 16. The process of any of Paragraphs 1 to 15, wherein the solvent is hexane and/or isohexane.

Paragraph 17. A process of forming a polymer comprising the steps of:

(a) supplying a feed having propylene and at least one comonomer selected from the group consisting of ethylene and $C_4$ to $C_8$ alpha-olefins in a solvent;

(b) contacting the feed with a catalyst to form a reaction mixture;

(c) treating the reaction mixture to form a first polymer-rich phase;

(d) heating the first polymer-rich phase;

(e) treating the heated first polymer-rich phase to form a second polymer-rich phase; and (f) devolatilizing the second polymer-rich phase to obtain the polymer, wherein the polymer has a viscosity greater than 0.01 Pa·s as measured by ASTM-D3236 at 190° C. and a ML (1+4, 125° C.) less than 100 as measured by ASTM-D1646.

Paragraph 18. A process of forming a polymer comprising the steps of:

(a) supplying a feed having propylene and at least one comonomer selected from the group consisting of ethylene and $C_4$ to $C_8$ alpha-olefins in a solvent;

(b) contacting the feed with a catalyst to form a reaction mixture;

(c) treating the reaction mixture to form a first polymer-rich phase;

(d) cooling the first polymer-rich phase;

(e) treating the cooled first polymer-rich phase to form a second polymer-rich phase; and (f) devolatilizing the second polymer-rich phase to obtain the polymer;

wherein the polymer has a viscosity measured by ATSM-D3236 at 190° C. of less than 0.01 Pa·s.

Paragraph 19. A plant for forming a polymer comprising:

a reactor for polymerizing monomers to form a reaction mixture;

a first separator downstream of the reactor for treating the reaction mixture to form a first polymer-rich phase;

a second separator downstream of the first separator for treating the first polymer-rich phase to form a second polymer-rich phase;

a devolatilizer downstream of the second separator for removing volatile component(s) from the second polymer-rich phase to obtain the polymer; and one or more temperature adjustment units for adjusting the temperature of the first and/or the second polymer-rich phases at one or more locations downstream of the first separator and upstream of the devolatilizer.

Paragraph 20. The plant of Paragraph 19, wherein the temperature adjustment unit is located downstream of the first separator and upstream of the second separator.

Paragraph 21. The plant of Paragraph 19, wherein the temperature adjustment unit is located downstream of the second separator and upstream of the devolatilizer.

Paragraph 22. The plant of Paragraph 20 further comprising an additional temperature adjustment unit located downstream of the second separator and upstream of the devolatilizer.

Paragraph 23. The plant of any of Paragraphs 19 to 22, wherein the temperature adjustment unit is for increasing the temperature of the first or the second polymer-rich phase.

Paragraph 24. The plant of any of Paragraphs 19 to 22, wherein the temperature adjustment unit is for decreasing the temperature of the first or the second polymer-rich phase.

Paragraph 25. The plant of Paragraph 22, wherein the additional temperature adjustment unit is for increasing the temperature of the second polymer-rich phase.

Paragraph 26. The plant of Paragraph 22, wherein the additional temperature adjustment unit is for decreasing the temperature of the second polymer-rich phase.

Paragraph 27. The plant of any of Paragraphs 19 to 26, wherein the temperature adjustment unit is a heat exchanger.

Paragraph 28. The plant of any of Paragraphs 19 to 27, wherein the devolatilizer is a vacuum devolatilizer, a vented extruder, a flash pot, a falling strand evaporator, or a thin film evaporator.

Paragraph 29. The plant of any of Paragraphs 19 to 28, wherein the second separator is a flash device.

Paragraph 30. The plant of any of Paragraphs 19 to 29, wherein the reactor comprises a first reactor and a second reactor, wherein the ratio of the internal volume of the first reactor to the internal volume of the second reactor being of from 50:50 to 95:5.

Paragraph 31. The plant of Paragraph 30, wherein the ratio of the internal volume of the first reactor to the internal volume of the second reactor is of from 65:35 to 90:10.

Paragraph 32. A plant for forming a polymer comprising:
a reactor for polymerizing monomers to form a reaction mixture;
a first separator downstream of the reactor for treating the reaction mixture to form a first polymer-rich phase;
a temperature adjustment unit downstream of first separator for increasing the temperature of the first polymer-rich phase;
a second separator downstream of the temperature adjustment unit for treating the first polymer-rich phase to form a second polymer-rich phase;
a devolatilizer downstream of the second separator for removing volatile component(s) from the second polymer-rich phase to obtain the polymer; and
wherein the polymer has a viscosity greater than 0.01 Pa·s as measured by ASTM-D3236 at 190° C. and a ML (1+4, 125° C.) less than 100 as measured by ASTM-D1646.

Paragraph 33. A plant for forming a polymer comprising:
a reactor for polymerizing monomers to form a reaction mixture;
a first separator downstream of the reactor for treating the reaction mixture to form a first polymer-rich phase;
a temperature adjustment unit downstream of first separator for decreasing the temperature of the first polymer-rich phase;
a second separator downstream of the temperature adjustment unit for treating the first polymer-rich phase to form a second polymer-rich phase;
a devolatilizer downstream of the second separator for removing volatile component(s) from the second polymer-rich phase to obtain the polymer; and
wherein the polymer has a viscosity measured by ATSM-D3236 at 190° C. of less than 0.01 Pa·s.

All documents cited herein are fully incorporated by reference for all jurisdictions in which such incorporation is permitted and to the extent they are not inconsistent with this specification. All values cited herein would be understood by persons of ordinary skill in the art that they are approximate values. Although dependent claims have single dependencies in accordance with U.S. practice, each of the features in any of the dependent claims can be combined with each of the features of one or more of the other dependent claims dependent upon the same independent claim or claims.

What is claimed is:

1. A plant for forming a polymer comprising:
a reactor for polymerizing monomers to form a reaction mixture;
a first separator downstream of the reactor for treating the reaction mixture to form a first polymer-rich phase;
a second separator downstream of the first separator for treating the first polymer-rich phase to form a second polymer-rich phase;
a devolatilizer downstream of the second separator for removing volatile component(s) from the second polymer-rich phase to obtain the polymer; and
two or more temperature adjustment units for adjusting the temperature of the first and/or the second polymer-rich phases at one or more locations downstream of the first separator and upstream of the devolatilizer, where at least a first temperature adjustment unit for adjusting the temperature of the first polymer-rich phase is located downstream of the first separator and upstream of the second separator, and a second temperature adjustment unit for adjusting the temperature of the second polymer-rich phase is located downstream of the second separator and upstream of the devolatilizer.

2. The plant of claim 1, wherein the first temperature adjustment unit is for increasing the temperature of the first polymer-rich phase.

3. The plant of claim 1, wherein the second temperature adjustment unit is for decreasing the temperature of the first polymer-rich phase.

4. The plant of claim 1, wherein the second temperature adjustment unit is for increasing the temperature of the second polymer-rich phase.

5. The plant of claim 1, wherein the second temperature adjustment unit is for decreasing the temperature of the second polymer-rich phase.

6. The plant of claim 1, wherein at least one of the first or second a temperature adjustment unit is a heat exchanger.

7. The plant of claim 1, wherein the devolatilizer is a vacuum devolatilizer, a vented extruder, a flash pot, a falling strand evaporator, or a thin film evaporator.

8. The plant of claim 1, wherein the reactor comprises a first reactor and a second reactor, wherein the ratio of the internal volume of the first reactor to the internal volume of the second reactor being of from 50:50 to 95:5.

* * * * *